D. I. GARRETSON.
HANDLE FOR UTENSILS WHICH ARE SUBJECTED TO HEAT.
APPLICATION FILED OCT. 17, 1913.
1,235,309.
Patented July 31, 1917.
2 SHEETS—SHEET 2.
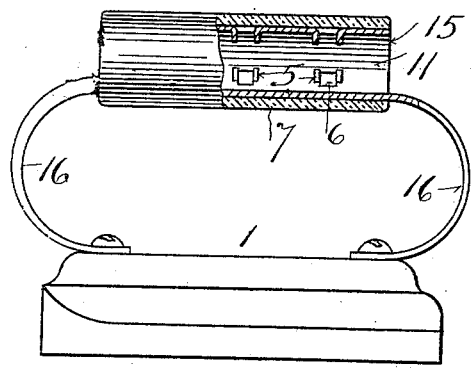
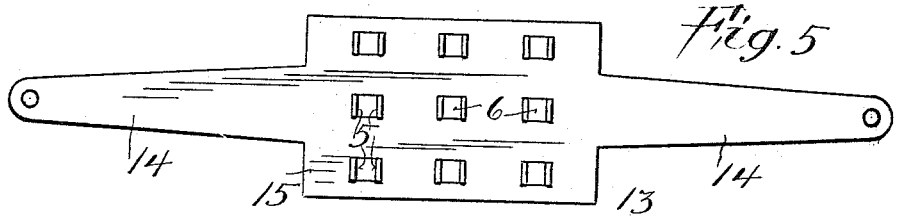
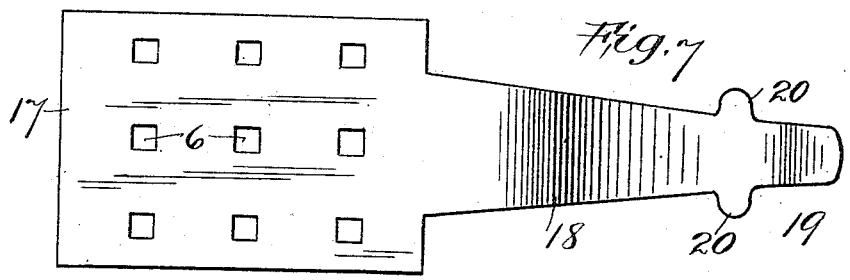
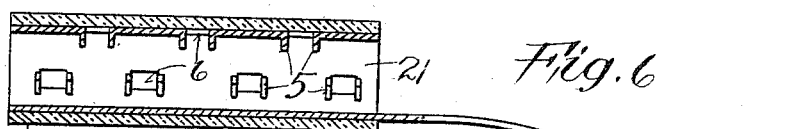
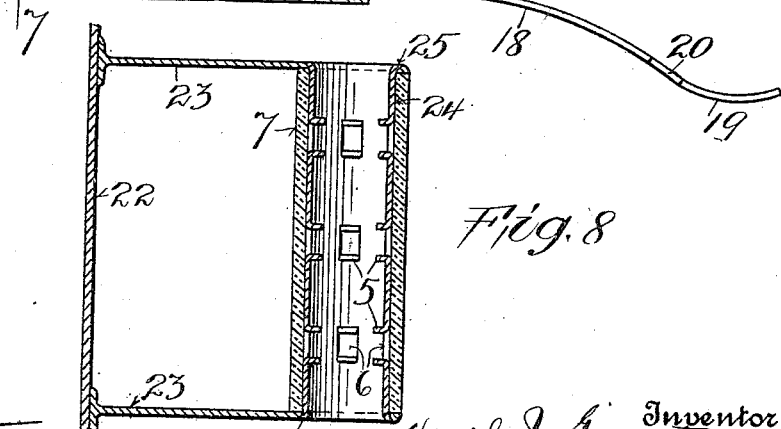

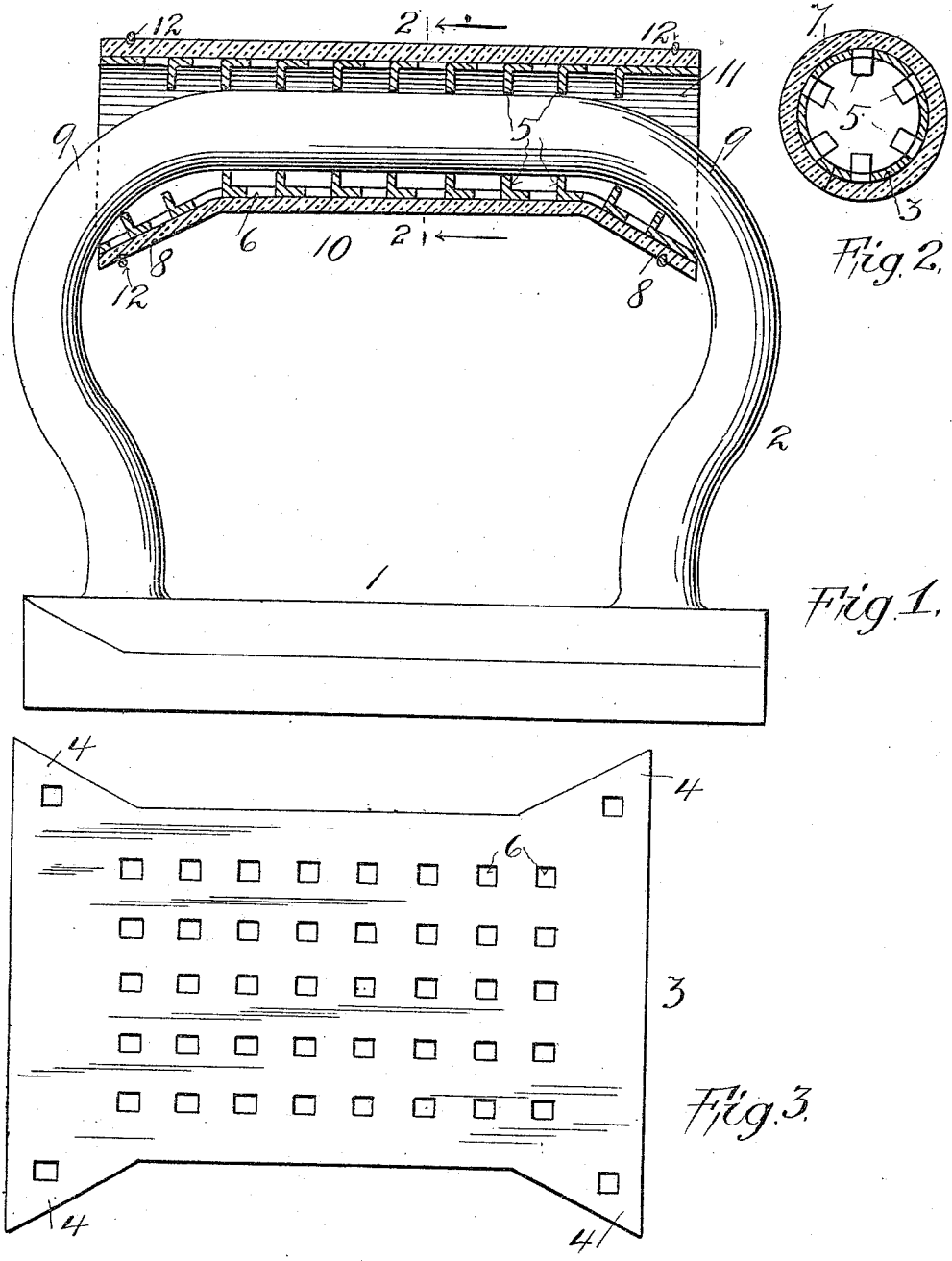

UNITED STATES PATENT OFFICE.

DAVID I. GARRETSON, OF BROOKLYN, NEW YORK.

HANDLE FOR UTENSILS WHICH ARE SUBJECTED TO HEAT.

1,235,309.　　　　　Specification of Letters Patent.　　Patented July 31, 1917.

Application filed October 17, 1913. Serial No. 795,647.

*To all whom it may concern:*

Be it known that I, DAVID I. GARRETSON, a citizen of the United States, and a resident of the borough of Brooklyn, city of New York, county of Kings, and State of New York, have invented certain new and useful Improvements in Handles for Utensils Which are Subjected to Heat, of which the following is a specification.

My invention relates to handles for utensils which are more or less subjected to heat. The object is to provide an inexpensive and convenient handle for utensils, which will remain sufficiently cool, or be self cooling, so that the handle may be grasped without danger of burning the hands, even though the article to which the handle is attached is placed on or near a source of heat. The handle is especially advantageous for sad irons, stove lifters, coffee pots, furnace doors and for many other devices which are more or less subjected to heat. When handles have been permanently attached to such articles they have been more or less subjected to heat with the utensil itself, either by the direct action of the heat, or by reason of conduction through the materials of which the articles and handles are made. Handles or holders which are intended to be detached from the utensils while the latter are subjected to heat and then attached to the utensil or used to grasp the same, are not altogether satisfactory because, as generally constructed, such handles absorb heat from the utensil after it is removed from the source of heat, to an undesirable extent. The object of the present device is to provide a handle or grip which will not become too hot for the hands even though the utensil itself is subjected to heat. The handle is so made that the hand is protected by insulating material, such as asbestos, and the heat received by the handle directly and by conduction is rapidly radiated in such a manner as not to uncomfortably affect the hands of the user.

I have shown my invention adapted to different kinds of utensils; and I have shown it both as a separable or detachable member and also as a fixed part of the utensil. For instance, I have shown my improvements embodied in a form which makes it convenient for attachment to sad irons now in use; and I have also shown the same in a form or forms in which the handle is made a fixed part of the utensil.

In the drawings forming a part of this application,

Figure 1 is an elevation of a sad iron having my improved handle attached thereto; in which view the handle is shown in section, Fig. 2 is a sectional view, taken on the line 2—2 of Fig. 1, Fig. 3 is a plan view of the metal sheet from which the handle is formed, showing the same in flat condition, as it is before being shaped into tubular form, Fig. 4 is an elevation, with parts in section, showing a sad iron with my improved handle permanently attached, Fig. 5 is a plan view of the sheet from which the handle shown in Fig. 4 is shaped, Fig. 6 is an elevation of a stove lifter embodying my invention, in which view the handle is shown in section, Fig. 7 is a plan view of the sheet from which the lifter is formed, and Fig. 8 is a sectional view of my improved handle adapted for coffee pots and the like.

In Figs. 1 to 3 I have shown a handle formed separately from the utensil in order that it may be readily applied to articles now in use. To illustrate the application of my invention I have shown an ordinary sad iron 1 having the fixed and bowed metal handle 2. In general practice it is customary to use a pad or holder in order to grasp this handle; and in order that the pad shall not become too heated it must be removed from the iron while the latter is being heated. These holders are often mislaid, or they become uncomfortably hot from contact with the iron handle. The handle herein shown, however, will remain sufficiently cool, even though attached to the iron while the latter is being heated.

In Fig. 3 I have shown the blank from which the handle is formed. This is preferably a sheet of metal 3 having, in the form shown in Figs. 1 to 3, the angular extensions 4 at the several corners. This sheet is provided with a number of projections 5 drawn or stamped from the sheet, thus leaving a number of apertures 6 therein. These projections are formed at various points on the plate, preferably at close intervals substantially throughout the surface of the plate. These projections are turned away from the sheet, they being shown as directed at right angles to the plane of the sheet; and they are preferably all directed from the same side of the sheet.

The sheet 3, as above set forth, is preferably made of metal to permit of its being shaped, and to provide a proper support and protection for the material which forms the grip.

The sheet is provided with a heat insulating material, preferably before it is bent into tubular shape. I have shown the plate covered with an imperforate coat of insulating material 7 to form the grip. I prefer to use asbestos or a similar non-inflammable and heat insulating material for this purpose; and it may be attached to the plate under pressure while hot, using silicate or other material to retain the parts in permanent bond.

The plate 3 and the insulating grip are now bent around to form a tube, which is preferably cylindrical throughout the greater portion of its length; and flaring at each end at the under portion. The flares 8 permit the handle to conform to the bends 9 in the iron handle 2 and still have the other portion of the handle remain cylindrical. The enlarged diameters caused by the flares 4 also tend to keep the hand in the intermediate portion 10 of the handle and prevent the fingers from coming into contact with the handle 2.

When the handle is bent around and secured to the iron handle, as shown in Fig. 1, the projections 5, extend inward or toward the middle of the cylindrical handle, and some of these contact with the iron handle 2 and keep the tubular handle spaced therefrom. This forms a heat radiating and a ventilating space 11 between the iron handle and the tubular handle, which opens outwardly at each end of the latter.

The stiffness of the metal of the tubular handle may serve to hold it in place upon the iron handle, but I prefer to provide binding bands which may be in the form of wires 12 passing around the tubular handle and having their ends twisted together.

The tubular handle is preferably retained on the iron handle permanently. When the iron is placed on the stove for heating, and afterward when being used, the heat conducted by the iron handle 2 will have but little effect upon the tubular handle owing to the comparatively limited contact surface between them. Such heat as may reach the plate 3 will be very rapidly radiated therefrom, owing to the lugs or projections 5 which extend into the radiating and cooling space. There will, therefore, be almost an inappreciable amount of heat conducted to the asbestos covering 7; and such as may reach the interior surface thereof will not reach the hand of the user owing to the heat insulating nature of the asbestos. The primary purpose of stamping the projections 5 from the sheet 3 is to reduce the superficial area of the sheet and provide means for more rapidly radiating the heat therefrom.

In Figs. 4 and 5 I have shown the improved handle constructed as a permanent part of the iron handle, as this form is preferable where irons are to be supplied with my improvements when manufactured. In this form a plate 13 having the shanks or strips 14 at each end, with an intermediate plate 15, is provided with a number of projections 5. These are shown in this form of the device as being arranged in pairs at opposite sides of the apertures 6; this being a mere variation in form from those previously described. In this form of the handle the insulating material 7 for covering the handle may be applied to the sheet 13 before the latter is shaped. The shanks 14 are bent downward to form bows 16 to correspond with the similar parts of the ordinary iron. The ends of these bows are secured to the iron. Previous to this, however, the plate 13 is curved around to form a tubular handle, extending upwardly from the top line of the bows, as shown in Fig. 4. In this form, as in the previous one, the tubular handle is hollow; thus providing an interior heat radiating space. The heat will be radiated in this form of device the same as in the previously described one, so that the handle will not become overheated. In this form of the invention there is the additional advantage that the handle and bow may be very cheaply made in one piece by stamping.

In Figs. 6 and 7 I have shown my invention employed in connection with a stove-lid lifter. Herein the plate 17 from which the handle is formed is provided with an arm 18, the latter having the tongue 19 and ears 20 which serve for engaging the stove lid in well known manner. The plate 17 is bent around to form a tubular handle 21. This handle, as in the previous forms, has the inwardly projecting radiating members 5 stamped therefrom; and the imperforate insulating covering 7. The heat conducted by the arm 18 to the handle is rapidly radiated from the projections and passes out of the ends of the tube; so that the exterior surface of the asbestos will not become overheated.

In Fig. 8 I have shown the invention applied to a coffee pot or similar vessel. 22 represents the wall of the receptacle, from which extend the parallel arms 23. Between the outer ends of the latter there is arranged a tubular shell 24 of stamped metal having the inwardly extending radiating projections 5. The ends of the tube 24 are swaged at 25 to firmly hold the handle between the arms 23. The insulating covering 7 surrounds the tube 24 and abuts against the arms 23.

In each form of the device a tubular body or shell is formed of stamped sheet metal with the inwardly extending radiating projections; and the shell is covered with the imperforate insulating material. This forms a very rapidly cooling handle which protects the hands. The device is very simple and inexpensive.

Having described my invention, what I claim is

1. A handle for devices subjected to heat, comprising a sheet of metal having an intermediate plate and oppositely extending arms, said arms being bent downwardly to form supports for attachment to a body and adapted to hold said intermediate plate in spaced relation to the body, said intermediate plate being bent into a tube to provide an interior chamber open at the ends, said plate having radiating projections extending laterally therefrom.

2. A handle of the character described, comprising a shell formed of sheet metal provided with projections stamped from the sheet and forming perforations in the sheet, said sheet being formed into tubular shape with an interior chamber open at the ends, and with said radiating projections extending inward in the said chamber, and an imperforate exterior covering of asbestos or similar heat insulating material for said shell, and closing the apertures in said shell.

Signed at the city, county and State of New York, this 14th day of October, 1913.

DAVID I. GARRETSON.

Witnesses:
A. B. DOLLARD,
CHARLES G. HENSLEY.

Copies of this patent may be obtained for five cents each, by addressing the "Commissioner of Patents, Washington, D. C."